United States Patent [19]

Okada

[11] Patent Number: 4,499,215

[45] Date of Patent: Feb. 12, 1985

[54] MODIFIED ASPHALT-EPOXY RESIN COMPOSITION

[76] Inventor: Sadashige Okada, 55, Kamiwakicho-2-chome, Nakagawa-ku, Nagoya, Japan

[21] Appl. No.: 518,070

[22] Filed: Jul. 28, 1983

[30] Foreign Application Priority Data

Jun. 3, 1983 [JP] Japan ................................. 58-98009

[51] Int. Cl.³ ........................ C08L 63/00; C08L 95/00
[52] U.S. Cl. .................................... 523/450; 525/54.5
[58] Field of Search ........................ 523/450; 525/54.5

[56] References Cited

U.S. PATENT DOCUMENTS

| | | | |
|---|---|---|---|
| 3,915,730 | 10/1974 | Lebureau et al. | 523/450 |
| 4,139,511 | 2/1979 | Hayashi et al. | 523/450 |
| 4,162,998 | 7/1979 | Doi et al. | 523/450 |
| 4,360,608 | 11/1982 | Hijikata et al. | 523/450 |

FOREIGN PATENT DOCUMENTS

| | | | |
|---|---|---|---|
| 666905 | 7/1963 | Canada | 523/450 |
| 46-21309 | 6/1971 | Japan | 523/450 |

*Primary Examiner*—Allan M. Lieberman
*Attorney, Agent, or Firm*—Armstrong, Nikaido, Marmelstein & Kubovcik

[57] ABSTRACT

An asphalt/epoxy resin coating composition in which asphalt and epoxy resin are sufficiently compatible with each other is produced by mixing under heat asphalt with a condensation product of an asphalt and a non-thermoreactive phenol resin such as $C_4$–$C_8$ alkylphenol-formaldehyde resin, the condensation being effected at a temperature of 160° to 200° C. in the presence of an arylsulfonic acid as catalyst.

The coating composition gives an excellent coating without separation of asphalt or silking based on the incompatibility of asphalt and epoxy resin, by mixing with a curing agent for epoxy resin.

7 Claims, No Drawings

MODIFIED ASPHALT-EPOXY RESIN COMPOSITION

This invention relates to a composition for coating made from an asphalt and an epoxy resin. More particularly, it relates to a homogeneous composition for coating made from an asphalt modified by a phenol resin and an epoxy resin.

As a composition for coating to be used for water proofing or rust prevention of civil engineering, construction or shipbuiliding materials, there have been proposed various curable compositions which contain both an inexpensive coal tar or asphalt and an epoxy resin and have the excellent water resistance and flexibility of the former as well as the excellent adhesiveness and mechanical strength of the latter. The range of applications of a coal tar composition which contains a carcinogenic substance is naturally limited, and the study on a coating composition for such fields has been concentrated on the use of asphalt.

But asphalt and epoxy resin are poorly compatible with each other, so that it is difficult to obtain a homogeneous composition therefrom. Accordingly, even when a composition formed of the above two components is cured by the action of a curing agent for epoxy resins, a homogeneous cured coating can not be obtained.

To overcome the above difficulties, there have been proposed, in order to improve the compatibility of asphalt and epoxy resin, physical methods of adding, as a third component, aromatic heavy boiling substances such as coal tar, anthracene oil, lubricating oil extract, xylene resins and alkylphenols, fulfural-extracted oil, or naphthenic acid, and chemical methods in which asphalt is subjected beforehand to oxidation, chlorination or hydrolysis. But even these methods have not yet given a practically usable composition.

The present inventor has, together with other co-inventors, previously applied for a patent on the invention of improving the compatibility by addition of a phenol resin (Japanese Patent Application No. 19852/77). The phenol resin used in the invention was a phenol resin obtained by condensing phenol, cresol, xylenol, butylphenol, p phenyl-phenol, or a mixture thereof with formaldehyde. Although the resulting composition was fairly homogeneous, it had still disadvantages in that, in the test for cured coating film according to JIS K 5664 (1972), it showed poor reproducibility in cross-cut adhesion test which tests the uniformity of adhesion, oil resistance test in which the separation of asphalt is revealed, the development of silking, and pencil scratch hardness which shows the hardness of the film, and moreover it was liable to be cracked by flexing.

The present inventors studied on the chemical modification of asphalt by phenol resins and found that the thus modified asphalt was highly compatible with epoxy resins. The present invention has been accomplish based on the above finding.

According to this invention, there is provided a modified asphalt/epoxy resin composition which is obtained by mixing under heating condensing an epoxy resin with a condensation product resulting from the condensation reaction of an asphalt with a non-thermoreactive phenol resin in the presence of an arylsulfonic acid as a catalyst.

The asphalt used in this invention may be either natural asphalt or blown asphalt. More preferred, however, are petroleum asphalt, particularly a straight asphalt derived from paraffin base crude oil and one with low sulfur content.

The non-thermoreactive phenol resin to be condensed with asphalt means herein an initial stage condensation product which is obtained by condensing a $C_4$–$C_8$ alkyl-substituted phenol such as p-tert-butylphenol, p-sec-butylphenol, p-amylphenol, and p-octylphenol, a phenyl-substituted phenol such as p-phenyl phenol, or a mixture of these with an aldehyde such as formaldehyde or acetaldehyde in the presence of an acidic or basic catalyst and which does not cure by mere heating and has an average molecular weight of 900 to 1400 and a softening point of 120° to 130° C. The non-thermoreactive phenol resin may also contain a small amount of a phenol resin formed by condensation of phenol substituted or unsubstituted by an alkyl haivng 3 or less carbon atoms with an aldehyde. Examples of acidic catalysts to be used include hydrochloric acid, sulfuric acid, phosphoric acid and oxalic acid and those of basic catalysts include sodium hydroxide, potassium hydroxide and calcium hydroxide. The amount of the catalyst to be used is 0.01 to 0.015 mol based on 1 mol of said phenols. The condensation is carried out in a known manner first at about 100° C. and then, after the separation of reaction water, at about 170° C. An example of resins of this kind on the market is a condensation resin formed from a equimolar mixture of p-tert-butylphenol and p-phenylphenol (HITANOL #1140, a trade name, sold by Hitachi Kasei & CO.).

The arylsulfonic acid used as the catalyst in the condensation of asphalt and non-thermo-reactive phenol resin helps the reaction proceed smoothly while preventing partial polycondensation. Examples thereof include p-toluenesulfonic acid, naphthalene-sulfonic acid, phenylsulfonic acid and mahogany acid. It is preferably used in the form of an ester thereof having 1 to 7 carbon atoms in the alkyl moiety. Butyl ester of p-toluenesulfonic acid is one of the preferred examples. In order to disperse the catalyst uniformly in the reaction system, a small amount of a common solvent to the catalyst and asphalt, such as dinonylphenol, is advantageously added to the reaction system or used for dissolving the catalyst.

In the condensation reaction, the asphalt and the non-thermoreactive phenol resin are heated and mixed in a ratio of 25 to 45 parts of the latter per 100 parts of the former. When the ratio is below the lower limit the separation of the two components is likely to occur, while when the ratio exceeds the upper limit the final product is poor in impact strength and the coating in multi-layer coating is liable to be peeled off. A small amount of a solvent such as xylene may be added to facilitate the mixing. The mixture is condensed by heating to 180° to 200° C. in such a manner that after the temperature of the mixture reached about 160° C. a dinonyl-phenol solution containing about 1 part of p-toluenesulfonic acid is added dropwise to the mixture while maintaining a temperature of 180° to 200° C.

After the addition of p-toluenesulfonic acid catalyst, the reaction proceeds rapidly accompanied by an active evolution of water, which is removed rapidly out of reaction system. After the completion of addition of the catalyst, the heating is continued further for 1 to 2 hours. The reaction is finished when the evolution of water has ended. After completion of the reaction the reaction system is subjected to a reduced pressure of about 100 mmHg to distil off the unreacted materials and remaining evolved water. The reaction mixture is then cooled to about 100° C. and the distilling off is further continued. The condensation product is filtered through a wire gauze to remove a small amount of heterogeneous matters. The solidified filtrate is then pulverized to give a modified asphalt. When the condensation product is to be subjected immediately to a heat treatment with an epoxy resin, the cooled reaction mixture may be dissolved in a suitable amount of a thinner such as xylene and filtered as the solution.

The epoxy resin used in this invention is a common compound which has one or more, preferably two or more, epoxy groups in the molecule and which cures by the action of a curing agent for epoxy resins to form a cured epoxy resin. Examples thereof include diglycidyl ether such as 2,2′-bis(4-hydroxyphenyl)propane or bis(4-hydroxyphenyl)ethane, novolak-epoxy compound, epoxidated olefin compound, and 2,3-epoxypropyl ether. These compounds are on the market as, for example, EPON 1004, 834, 827 (trade names, made by Shell & Co.) and ADK. EP 4000 (a trade name, made by Asahi Electrochemicals & Co.). These epoxy resins are used to be mixed with the modified asphalt in various proportions, each alone or in a combination thereof, depending on the intended uses. The mixing ratio is selected to meet the individual uses from a range of 30 to 100 parts of an epoxy resin per 10 parts of a non-thermoreactive phenol resin.

The modified asphalt ahd the epoxy resin may be mixed and heated as such, but are preferably mixed with a suitable amount of a solvent to facilitate the mixing of the two and the whole are heated and mixed at 90° C. to 140° C.

The modified asphalt/epoxy resin composition of this invention thus prepared may be incorporated with other auxiliary ingredients for coating and used to form cured coatings suitable for various uses by the action of a curing agent.

The curing agent to be used for the composition of this invention may be any of the substances which are known as curing agents for epoxy resins. Particularly preferred are polyamine type curing agents. Examples thereof include modified polyamines, modified aliphatic polyamines, alicyclic polyamines, modified aromatic polyamines, and polyamide amines. These amines are put on the market, for example, as various grades of EPOMIK curing agents (trade names, products of Mitsui Petrochemical Epoxy & Co.). These curing agents are mixed into the composition of this invention in an amount to give active hydrogen equivalents corresponding to the epoxy equivalents of the composition. The pot life of the resulting mixture varies depending on the curing agent used.

The coating formed of the composition of this invention adheres tightly with wood, Portland cement, aggregate, glass, ceramics and metal. It has an excellent dimensional stability in curing, water resistance, salt water resistance, chemical resistance, oil resistance, solvent resistance, rust preventing property, and anitcorrosion property; does not crack for a long period of time. It is also worth special mention that even when thickly coated in one application the resulting coating is strong and flexible, and withstands outdoor exposure for a long period of time.

The asphalt composition according to this invention can be, as desired, incorporated with auxiliary ingredients conventionally used in synthetic resin-base coating materials such as plasticizers, antioxidants, flame-retardants, dispersion accelerators, various kinds of colorants, inorganic fillers, curing accelerators, flow regulators, and diluents such as toluene, xylene, butanol, ethyl acetate, butyl acetate, methyl ethyl ketone, methyl isobutyl ketone and cyclohexanol.

This invention is illustrated below with reference to Examples, but the invention is not limited thereto, the part being by weight.

EXAMPLE 1

Into a rection flask, were placed 600 g of a straight asphalt prepared at 180° C. or above and 200 g of HITANOL #1140. The flask was heated on a mantle heater to melt the content. The gas evolved during heating was washed with an aqueous alkali solution in a washing bottle and discharged out of the reaction system by use of an aspirator. When the temperature reached 165° C., stirring was started and 10 g of p-toluene sulfonic acid butyl ester dissolved in 100 cc of dinonylphenol was added dropwise into the flask from a dropping funnel. Heating was continued to keep the temperature of the reaction mixture at 180° to 190° C. The addition of the catalyst solution was continued for 2 hours until completion of the addition of the whole solution. Water vapor was evolved actively during the time, and the heating was continued further for 1 to 2 hours while the evolved water being removed rapidly out of the system.

The reaction mixture was further treated under a reduced pressure of 100 mmHg for 1 hour to remove the unreacted material and reaction water completely and to complete the reaction. Heating was stopped, and the reaction product was filtered through a 200 mesh wire gauze while it still retained a sufficient flowability, and then cooled and pulverized to obtain a modified asphalt.

Then, 90 parts of the modified asphalt thus obtained and an epoxy resin mixture (200 parts in total) consisting 20 parts of EPON #1004, 50 parts of #834, 100 parts of #827 and 30 parts of ADK #4000 were heated in 29 parts of xylene (thinner) at 135° C. for 3 hours to obtain a coating composition of this invention. The composition does not undergo phase separation as it is and also as diluted with thinner.

By adding, to 310 parts of the coating composition, 14.5 parts of a flow regulator [VECAMIN-P #138 (made by Dainippon Ink & Co.)] and 14.5 parts of xylene and stirring the mixture thoroughly, a homogeneous coating material curable with a curing agent is obtained. The cured film formed of the material has an excellent gloss and does not show silking due to the exudation of asphalt.

EXAMPLE 2

The procedures in Example 1 were repeated except that 200 parts of straight asphalt (40/60) for general road pavement, 67 parts of HITANOL #1140, 3 parts of butyl p-toluene-sulfonate, and 33 parts of dinonylphenol were used to obtain a modified asphalt.

Then 300 parts of the modified asphalt thus obtained and an epoxy resin mixture (670 parts in total) consisting of 70 parts of EPON #1004, 200 parts of #834, 300 parts of #827 and 100 parts of ADK Ep #4000 were dissolved in 194 parts of a thinner having the following composition.

| Composition of thinner | % by weight |
| --- | --- |
| Xylene | 12.5 |
| Toluene | 12.5 |
| Butyl acetate | 25 |
| Isopropyl alcohol | 10 |
| Butyl cellosolve | 5 |

The solution was heated at 135° C. for 160 minutes, then cooled to 60° C., mixed with 30 parts of VECAMIN-P #138 and finished by passing 3 times through inking rollers.

The composition thus obtained had an epoxy equivalent of about 422.

A curing agent composition was prepared by mixing 18 parts of Curing agent Q635 (modified alikphatic polyamine, active hydrogen equivalent 76, sold by Mitsuipetrochemical Epoxy & Co.) and 2 parts of DMP-30 [2,4,6tris(di-methylaminomethyl)phenol] with a thinner of the above-mentioned composition to give a total amount of 30 parts.

The coating composition which is the principal ingredient and 30 PHR of the curing agent composition were weighed out accurately and mixed together to give a solution which was diluted with the thinner to give a viscosity suitable for brushing or spraying of 2000 to 3000 cp. This solution is also homogeneous and does not undergo phase separation upon standing.

The coating cures at room temperature to tackfree dry in 6 to 8 hours and to complete cure in 7 days. The coating film was tested according to JIS K 5664 (1972) ("testing method for tar/expoxy resin coating material"). The results obtained were as shown in Table 1.

EXAMPLE 3

The procedurs in Example 1 were repeated by using, in place of HITANOL #1140, a phenol resin obtained by heating 1 mol of p-tert-butylphenol and 1 mol of formaldehyde in the presence of 0.01 mol of hydrochloric acid at 100° C. for 3 hours and then, after separation of water, at 170° C. for 2 more hours. A coating composition was obtained which gave a cured film with no silking.

EXAMPLE 4

In order to produce a coating film which is excellent particularly in heavy-duty anti-corrosion, 1400 parts of a straight asphalt prepared at 180° C. or above and 600 parts of HITANOL #1140 were placed in a raction flask, heated and molten. The evolved gas was removed out of the system. When a temperature of 165° C. was reached, stirring was started and 250 cc of dinonylphenol solution containing 25 g of butyl p-toluene-sulfonate was added dropwise into the flask. The dropwise addition of the catalyst solution was continued for 3 hours until completion of the addition of the whole solution. Water vapor was evolved during the time, and the heating was continued for further 1 to 2 hours while the evolved water vapor being removed out of the system. The reaction mixture was further treated under a reduced pressure of 100 mmHg for 1 hour to remove the unreacted material and reaction water completely and to complete the reaction.

Heating was then stopped, and the reaction product was filtered through a 200 mesh wire gauze while it still retained a sufficient flowability, and then pulverized to obtain a modified asphalt.

A mixture of 2000 parts of the modified asphalt obtained above and an epoxy resin mixture (3600 parts in total) consisting 1000 parts of EPON #1004, 1200 parts of #834, 1200 parts of GUN (a trade name, made by Nihon Kayaku & Co.) and 400 parts of EPOMIC R-090 (made by Mitsuipetrochemical Epoxy & Co.) was heated in 560 parts of xylene (thinner) under reflux at 135° C. for 3 hours to obtain a coating compositon of this invention. The composition does not undergo phase separation as it is and also as diluted with thinner.

By adding, to 6160 parts of the coating composition, 180 parts of a flow regulator [VECAMIN-P #138 (made by Dainippon Inc & Co.)] and 280 parts of xylene (thinner) and stirring the whole thoroughly to give a homogeneous mixture, a coating material curable by use of a curing agent is obtained. The cured film formed of the material has an excellent gloss and does not show silking due to the exudation of asphalt.

Various fillers such as red ion oxide, titanium oxide, talc, graphite, and zinc oxide may be suitably added to the composition depending on the intended objects.

TABLE 1

| Test Item | Test Condition | Test result |
| --- | --- | --- |
| Condition in vessel | | Uniform, with no rigid lump |
| Miscibility | | Uniformly miscible |
| Operability | | Operation of airless spray and air spray can be performed with no trouble |
| Drying time | | Tack-free dry: within 3 hr |
| | | Semi-cure: within 24 hr |
| Appearance of coating | | No flow mark, void, or wrinkle observed |
| Pot life | | Pot life: 8 hr |
| Flex resistance | Bending with a diameter of 10 mm | No crack or scaling observed |
| Impact resistance | A weight of 500 g is dropped from a height of 300 mm | No crack or scaling observed |
| Repeated cooling and heating test | 3 cycles; 1 cycle; 2 hr at −20° C. and 2 hr at 80° C. | No blister, crack, or scaling observed |
| Oil resistance | Immersion in kerosene for 7 day | No crack, blister, scaling, or elution observed |
| Alkali resistance | Immersion in 5 W/V % sodium sodium hydroxide solution for 7 day | No wrinkle, blister, or scaling observed |
| Acid resistance | Immersion in 5 W/V % sulfuric acid solution for 7 day | No change |
| Gasoline resistance | Immersion in No. 3 gasoline for testing for 48 hr | No change |
| Salt water resistance | Immersion in 5 W/V % sodium chloride solution for 5 day | No change |

TABLE 1-continued

| Test Item | Test Condition | Test result |
| --- | --- | --- |
| Moisture resistance | 5 day; temperature: 50 ± 1° C.; relative humidity: 95% or more | No blister, scaling, or rust observed |
| Residue on heating of coating mixture (%) | | 61 |
| Viscosity | BM-type viscometer, 24° C. | 3300 centipoise at the time of mixing 9300 centipoise after 4 hr |
| Pencil scratch hardness | | H |
| Cross-cut adhesion test | | No peeling |

What is claimed is:

1. A modified asphalt/epoxy resin composition which comprises an epoxy resin and a modified asphalt; the modified asphalt being obtainted by condensing, in the presence of an arylsulfonic acid as catalyst, 100 parts by weight of an asphalt with 25 to 45 parts by weight of a non-thermoreactive phenol resin having an average molecular weight of 900-1400 and obtained by condensing a member selected from the group consisting of an alkylphenol having 4 to 8 carbon atoms in the alkyl moiety and phenylphenol with an aldehyde selected from the group consisting of formaldehyde and acetaldehyde;
wherein the ratio of the epoxy resin and the modified asphalt is 30 to 100 parts by weight of the epoxy resin based on 10 parts by weight of the non-thermoreactive phenol resin in the modified asphalt.

2. A composition according to claim 1 wherein the arylsulfonic acid is p-toluene-sulfonic acid, naphthalenesulfonic acid, phenylsulfonic acid or mahogany acid.

3. A composition according to claim 1 wherein the arylsulfonic acid is added to the reaction system in the form of an alkyl ester thereof having 1 to 7 carbon atoms in the alkyl moiety.

4. A composition according to claim 1 wherein the condensation reaction is carried out a temperature of 160° to 200° C.

5. A process for producing a modified asphalt-epoxy resin composition which comprises mixing an epoxy resin and a modified asphalt; the modified asphalt being obtained by condensing, in the presence of an arylsulfonic acid as catalyst and at a temperature of 160° to 200° C. until evolution of water ceases, 100 parts by weight of an asphalt with 25 to 45 parts by weight of non-thermoreactive phenol resin having an average molecular weight of 900-1400 and obtained by condensing a member selected from the group consisting of an alkylphenol having 4 to 8 carbon atoms in the alkyl moiety and phenylphenol with an aldehyde selected from the group consisting of formaldehyde and actaldehyde;
wherein the ratio of the epoxy resin and the modified asphalt is 30 to 100 parts by weight of the epoxy resin based on 10 parts by weight of the non-thermoreactive phenol resin in the modified asphalt.

6. The process according to claim 5, wherein the mixing is effected at a temperature of 90° to 140° C.

7. The process according to claim 5, wherein the mixing is effected in the presence of a solvent.

* * * * *